United States Patent
Kelly et al.

(10) Patent No.: US 7,321,865 B2
(45) Date of Patent: Jan. 22, 2008

(54) METHOD FOR DETERMINING RETAIL UNIT SPECIFIC PRICE SENSITIVITIES

(75) Inventors: Thomas Kelly, Dade City, FL (US); Nicholas M. Kiefer, Ithaca, NY (US); Alex Wohlhueter, Riverview, FL (US)

(73) Assignee: Revenue Management Solutions, Inc., Tampa, FL (US)

( * ) Notice: Subject to any disclaimer, the term of this patent is extended or adjusted under 35 U.S.C. 154(b) by 0 days.

(21) Appl. No.: 10/972,447

(22) Filed: Oct. 26, 2004

(65) Prior Publication Data

US 2005/0060223 A1    Mar. 17, 2005

(51) Int. Cl.
*G06F 17/30*    (2006.01)

(52) U.S. Cl. ....................................... 705/10
(58) Field of Classification Search ................ 705/10
See application file for complete search history.

(56) References Cited

U.S. PATENT DOCUMENTS

| | | | | |
|---|---|---|---|---|
| 5,822,736 | A * | 10/1998 | Hartman et al. ............... | 705/1 |
| 5,987,425 | A * | 11/1999 | Hartman et al. ............... | 705/20 |
| 6,078,893 | A * | 6/2000 | Ouimet et al. ................ | 705/10 |
| 6,553,352 | B2 * | 4/2003 | Delurgio et al. ............. | 705/400 |
| 7,072,848 | B2 * | 7/2006 | Boyd et al. .................. | 705/10 |
| 7,133,848 | B2 * | 11/2006 | Phillips et al. .............. | 705/400 |
| 2001/0051932 | A1 * | 12/2001 | Srinivasan et al. ......... | 705/400 |
| 2002/0116348 | A1 * | 8/2002 | Phillips et al. .............. | 705/400 |

FOREIGN PATENT DOCUMENTS

JP        10312493 A  * 11/1998

OTHER PUBLICATIONS

Hayes, David et al., Menu Analysis: A Better Way Cornell Hotel and Restaurant Administration Quaterly, Feb. 1985, vol. 25, No. 4, Abstract.*
Kelly, Thomas John et al., Menu Pricing; An Experimental Approach COEX, 1993.*
Kiefer, Nicholas M. et al., Menu Pricing: An Experimental Approach Journal of Business and Economic Statistics, Jul. 1994, vol. 12, No. 3, pp. 329-337.*
Bayou, Mohamed E. et al., Profitability Analysis for Table-Service Restaurants Cornell Hotel and Restaurant Administration Quaterly, Apr. 1992, vol. 33, No. 2, pp. 49-55.*
Hayes, David K. et al., Value Pricing: how low can you go? (value pricing for restaurants) Cornell Hotel and Restaurant Administration Quaterly, Feb. 1995, vol. 36, No. 1.*

(Continued)

*Primary Examiner*—Romain Jeanty
*Assistant Examiner*—Scott L. Jarrett
(74) *Attorney, Agent, or Firm*—Baker & Hostetler LLP

(57) ABSTRACT

A method of determining a price sensitivity index for one or more retail units is based on the relation between profits, sales or traffic and a fixed weight price index based on information from individual retail units. Statistical regression and the theory of the single-product firm is used to analyze the relation between changes in performance variables and changes in the price index, leading to a unit-specific index of sensitivity. This information allows stores to be sorted into those which can see price aggression, those which cannot, and those which are likely to respond to promotions.

19 Claims, 1 Drawing Sheet

Gross Profit Curve Relationship

OTHER PUBLICATIONS

Kelly, Thomas K., A Demand-Based approach to Menu Pricing Cornell Hotel and Restaurant Administration Quaterly, Feb. 1994, pp. 48-52.*

Byung-Do, Kim et al., Modeling the Distribution of Price Sensitivity and Implications for Optimal Retail Pricing Journal of Business & Economic Statistics, Jul. 1995, vol. 13, No. 3, pp. 291-303.*

Kiefer, Nicholas M. et al., Price Recollection and Preceived Value In Restaurants Cornell Hotel and Restaurant Administration Quaterly, Feb. 1995, pp. 47-50.*

Kasavana, Michael L., Menu Engineering; Bottom Line Software The Bottom Line, Apr.-May 1996.*

Lewis, Robert et al., Price-Sensitivity Measurement Cornell Hotel and Restaurant Administration Quaterly, Apr. 1997, vol. 38, No. 2, pp. 44-54.*

Morrison, Paul, Menu engineering in upscale restaurants British Food Journal, 1997, vol. 99, No. 10, pp. 388-395.*

Kasavana, Michael L., Window-based menu engineering The Bottom Line, Apr.-May 1998, vol. 13, No. 3, pp. 18-20.*

Mifi, Mazalan, Menu Development and Analysis Hotel-Online, Jul. 2000.*

Davis, Bernard et al., Food and Beverage Management Third Edition Butterworth-Heinemann, 1998, ISBN: 070532860.*

Pearce, Michael Retail Marketing Management Nelson Canada, 1992, ISBN: 0176034382.*

Mason, Barry J. et al., Modern Retailing Theory and Practice Third Edition Business Publications, Inc., 1984.*

Dolan, Robert et al., Power Pricing The Free Press, 1996, ISBN: 068483443X.*

Pindyck, Robert S. et al., Microeconomics Second Edition Macmillan Publishing, 1992, ISBN: 0023958901.*

Miller, Jack E. et al., Menu Pricing & Strategy Fourth Edition Wiley, Jul. 14, 1996, ISBN: 0471287474.*

Mann, Linda L., Menu analysis for improved customer demand and profitability in hospital cafeterias Canadian Journal of Dietetic Practice and Research, Spring 1999.*

Evoy, Ken et al., Make Your Price Sell! SiteSell.com, First Edition 2000, ISBN: 096842922X.*

Kasavana, Michael L. et al., Menu Engineering Hospitatility Publications, Inc., 1990, ISBN: 0932235069.*

Dougan, Jim, Menu engineering with electronic spreadsheets The Bottom Line, Dec. 1993, vol. 8, No. 6.*

Venkatesh, Shankar et al., Relating Price Sensitivity to Retailer Promotional Variables and Pricing Policy: An Empirical Analysis Journal of Retailing, vol. 72, No. 3, 1996, Abstract.*

Subrahmanyan, Saroja et al., Developing Optimal Pricing and Inventory Policies for Retailers Who Face Uncertain Demand Journal of Retailing, vol. 72, No. 1, 1996, pp. 7-30.*

LeBurto, Stephen et al., Using the Contribution Margin Aspect of Menu Engineering to Enhance Financial Results International Journal of Contemporary Hospitality Management, vol. 9, No. 4, 1997.*

Bell, David R. et al., The Decomposition of Promotional Response: An Empirical Generalization Marketing Science, vol. 18, No. 4, 1999, pp. 504-526.*

Weiskopf, David, The Impact of Omitting Promotion Variables on Simulation Experiments International Journal of the Economics of Business, vol. 7, No. 2, Jul. 2000, pp. 159-166.*

Student's t-distribution/t-statistic definition Wikipedia.org, Retrieved Sep. 6, 2006.*

Makridakis, Spyros et al., Forecasting Methods and Applications—Third Edition John Wiley & Sons, 1998, ISBN: 0-471-53233-9.*

Lloyd, Murphy T., Determining the Appropriate Equation in Multiple Regression Analysis The Appraisal Journal, vol. 57, No. 4, Oct. 1989, pp. 498-517.*

Chan, Wilco et al., Profit Measurement of Menu Items Cornell Hotel and Restaurant Administration Quaterly, vol. 39, No. 2, Apr. 1998, pp. 70-75.*

* cited by examiner

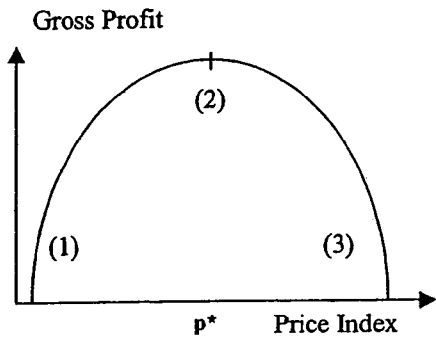
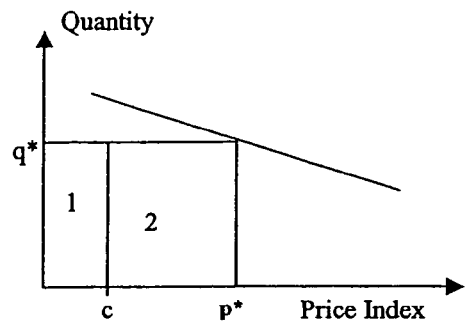
Figure 1a - Gross Profit Curve Relationship
Figure 1b - Price Quantity Relationship
Figure 2
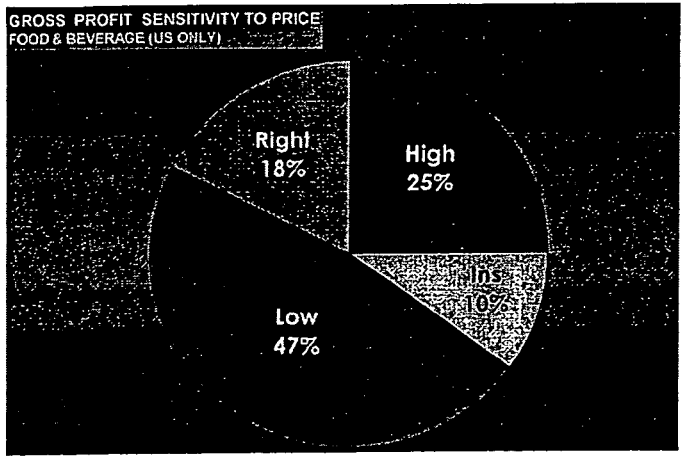
Figure 3
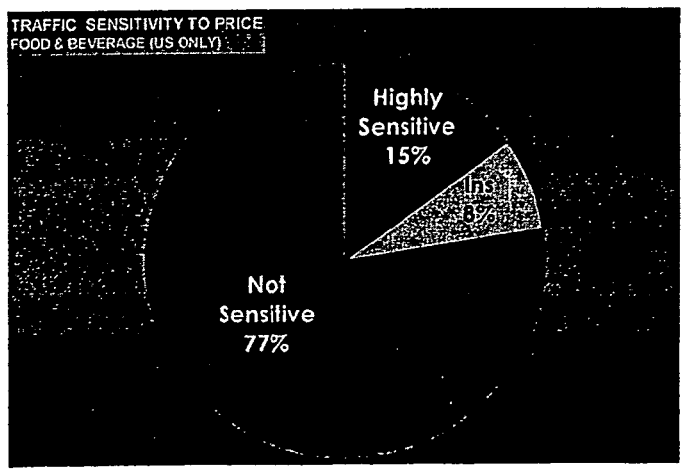

METHOD FOR DETERMINING RETAIL UNIT SPECIFIC PRICE SENSITIVITIES

This application claims priority to U.S. patent application Ser. No. 10/292,532, filed Nov. 13, 2002, titled "Method for Determining Retail Unit Specific Price Sensitivities," which claims priority under 35 U.S.C. § 119(e) based on Provisional Patent Application No. 60/331,213, filed on Nov. 13, 2001.

FIELD OF THE INVENTION

The present invention is directed to a method for determining retail unit specific price sensitivities, and in particular to a method that directly links a weighted price index to profits and traffic and further eliminates seasonality effects by comparing year over year changes.

BACKGROUND ART

In the prior art, it is common to implement pricing or promotion strategies for a chain of retail outlets. However, a problem often arises because one or more local unit managers complain that the overall pricing or promotion strategy does not apply to their stores; the "yes, but my store is different" syndrome. Often times, the local manager's observations are accurate due to the access to local information and experience that is typically unavailable to corporate headquarters.

Consequently, there is a need to develop better techniques for identifying the price sensitivities of a store or business unit. The present invention solves this need by providing a method to permit the identification of the price sensitivities of one or more stores. With this information, a business owner can determine whether a particular store can raise prices or is too price sensitive and should concentrate on promotions rather than raising prices.

SUMMARY OF THE INVENTION

It is a first object of the present invention to provide a method of identifying store price sensitivities for marketing purposes.

Another object of the invention is a method of identifying store price sensitivities that eliminates seasonal effects.

Still another object of the invention is a method that enables a store owner to better maximize profits through price promotions rather than higher prices or vice versa.

Other objects and advantages of the present invention will become apparent as a description thereof proceeds.

The store sensitivity analysis produces summary numbers for individual units in a chain, allowing classification of units according to how price sensitive both profits and traffic are (sales are used instead of profits when sales are available and profits are not). Two regressions can be used together or individually to categorize stores into groups reflecting various pricing status and traffic sensitivity similarities. One is the gross profit regression and the other is the traffic regression. These two regressions by themselves return valuable information on the pricing status and sensitivities of the stores in the system. Moreover, as the combination of these two regression results is used to categorize stores into groups that are homogenous, similar revenue management and profit maximizing strategies may be employed on each store in the category.

Stores that are determined to be price sensitive by the invention in both profits and traffic should exercise care in raising prices, but opportunities to exploit price promotions may still exist. Stores that are not price sensitive can be more aggressive in pricing across the board.

BRIEF DESCRIPTION OF THE DRAWINGS

Reference is now made to the drawings of the invention wherein:

FIG. 1a is a graph comparing gross profit function compared to price;

FIG. 1b is a graph comparing quantity of items sold versus price;

FIG. 2 is a pie chart showing gross profit sensitivity to price; and

FIG. 3 is a pie chart showing traffic sensitivity to price

DESCRIPTION OF THE PREFERRED EMBODIMENTS

The invention offers significant advantages in the field of pricing and promotion strategies by being able to identify the price sensitivity of a retail unit amongst a number of retail units. Identifying this price sensitivity provides invaluable information in permitting an owner to better identify which marketing tools are better suited for that store.

The inventive method involves a number of steps, the steps principally analyzing the affects of gross profit and traffic or customer count on pricing.

A first step involves developing a database of information over time for each store in terms of various variables relating to price sensitivity, e.g., prices, profits, sales, items being sold, quantity of items, time periods, for determining a fixed weight price index. The index is used to assist in analyzing gross profits and traffic for stores and sets of stores. In analyzing gross profit, a regression analysis is made wherein the analysis delivers a category measure of pricing status: "Low" indicates that price increases are likely to lead to improvements in gross profit, the store can be more aggressive in pricing. "High" indicates that the store's prices are high and care needs to be taken in considering future increases, i.e., the store is price sensitive. It is important to understand that a pricing performance categorization of "High" for the store does not limit the pricing strategy of that store from improving profits. On the contrary, it indicates that increased profits can still be realized, potentially by decreasing prices or increasing promotional activity using appropriate items. "Right" indicates that the price level, as measured by the sensitivity statistic, is about right; judicious price increases can be made, but perhaps there are opportunities in manipulating menu mix by pricing policy. "Insufficient evidence" indicates that the evidence for the store is mixed.

The second regression analysis focuses on traffic or customer count. This analysis delivers a category measure of traffic sensitivity in relation to the price index (how does quantity vary with the price index.) "Not Sensitive" indicates that the price increases have no adverse affects upon traffic. A flat or even estimated positive slope of the line basically indicates no relationship between traffic and increases in price. "Sensitive" or "Highly Sensitive" reflects a traffic sensitivity to price increases that begins to evidence a downturn in traffic when increased prices are implemented, i.e., a negative slope showing that when the price index increases, traffic decreases.

While it is preferred to perform both regression analyses for a complete picture of store sensitivity, either analysis could be done alone.

The following better demonstrates the impact that the inventive analysis framework could have on store profitability. Stores in the "Sensitive" traffic category and in the "High" price performance category are likely to see revenue gains from price decreases and should be extremely cautious about increases. Those with "Insensitive" traffic and "Low" price performance are in line for price increases. To understand how these measures affect store performance, consider the likely shape of the gross profit function graphed as a function of price as shown in FIGS. 1a and 1b.

Referring to FIG. 1a, at prices below unit cost, of course gross profit is negative (this pricing strategy is easy to rule out), and at price equal to unit cost, labeled below (1) in FIG. 1a, gross profit is zero. As price increases from (1), gross profit can be expected to increase, as long as consumers want the product at all. Now consider what happens as the price becomes high. Contribution margin increases, but the quantity sold can reasonably be expected to decline. At some price, the quantity will be zero, and hence so will gross profit. This is below point (3) in FIG. 1a. As the two effects of prices operate, a gross profit function of the general shape given in FIG. 1a can be produced. Maximum gross profit (2) occurs at price p*. Of course, the seller would like to choose the price p*, at which gross profit is maximized.

An important aspect of the inventive store sensitivity system is the ability to examine data on prices and gross profits and determine whether stores are operating at or near p*, at prices below p*, or at prices above p*. Identifying the store's relationship to p* gives the store owner insight as to what should be done to improve profits.

In contrast to FIG. 1a, which focuses on the relationship between gross profit and price, another aspect of the invention relates to the relationship between traffic or quantity sold and price. This relationship can be used to illustrate the development of the gross profit function from assumptions on consumer demand. Referring to FIG. 1b, suppose that q represents the quantity sold of an item. Further suppose that the quantity sold q of the item in question is a function of price. Suppose further for illustration that it is a linear function $q=a-b*p$, as graphed in FIG. 1b. Assume that the per-unit cost is c (refer to FIG. 1a). Consider the price p* in FIG. 1b. At that price, the quantity sold is q*, from the demand function. Revenue realized is p* times q* namely the area of the indicated rectangles 1 and 2. Cost (food cost) is given by q* times c, also indicated as the area of rectangle 1 on the graph. The difference between these areas is exactly gross profit or rectangle 2. Thus FIG. 1a, the gross profit function, can be developed from FIG. 1b by considering different prices, reading the corresponding quantities from the demand function, calculating revenue and cost and taking the difference for gross profit, and graphing gross profit against prices. However, this method is quite tedious and requires a number of steps to arrive at gross profit based on individual products. In the store sensitivity analysis of the invention, gross profit is studied directly; not via the demands for individual products. This is a tremendous simplification and advantage when dealing with multi-product situations.

The stylized case of a firm selling one product in varying quantities provides a useful framework for focusing ideas, but implementation in the case of restaurants with full menus or retail stores with full product lines are different situations entirely. The store sensitivity approach emphasizes restaurant-level characteristics, not item-level characteristics.

In order to develop a single summary measure of pricing status, it is preferred to develop a single index summarizing the prices in a particular store. This index of prices can be calculated for individual stores over many periods, and the relation between the price index and a measure of gross profit can be examined on the basis of co-variation between the two variables.

When dealing with indices, one question to consider is the use of weighted averages of the prices of the different menu items as a summary measure of the prices in a given store in a given period. If a weighted index is selected, the question then becomes what weights should be used. One possibility is to weight by menu mix. In this case, the index is simply the check average defined as total revenue divided by total items sold ($10.00 in revenue/5 items=2.0). This calculation involves the use of the price of the items weighted by the number sold. The problem with this approach is that because menu mix changes from period to period as consumer purchasing behavior varies, changes in the check average will occur even when prices have not moved. Put another way, while prices may stay the same, the number of items may change, thus changing the price index.

The present invention avoids this pitfall through the use an index, which is an indicator of movements of prices within the store's control. The check average mixes up changes in prices and changes in quantities sold from period to period and is therefore not desirable. A fixed-weighted index is preferred since it does not suffer from the problems of a check average and is more appropriate for determining price sensitivities. Fixed weight indices are well known in the statistic art, and a detailed explanation is not deemed necessary for understanding of the invention.

It is preferred to weight the different prices by a measure of the relative importance of each price in revenue production. The inventive store sensitivity analysis approach uses a fixed-weight system in which the weights are the average menu mix per store over the period considered. This method produces an index which moves only when prices move, but which still does weight prices according to their revenue contribution. This technique does not use the check average approach, which can move even if prices do not.

Referring back to the regression analysis of gross profit or quantity sold, a number of store/period specific variables for use in the analysis include: (1) lnpp, the logarithm of profits (these can be actual profits, or a measure adjusted for changes in costs, or if profits are unavailable, sales; (2) lntraffic, the logarithm of a measure of traffic (either customer counts or number of items sold); and (3) lnpind, the logarithm of the price index constructed as described above. Periods can vary such as by day, week or month.

In the ideal, full data case, data are available for more than one year. Having data for more than a year allows new variables to be formed, i.e., dlnpp, dlntraffic, and dlnpind, the year over year changes in each of these variables. For example, dlnpp can represent the difference between profits in week 27 in the current year and week 27 of the previous year. The regression coefficient of dlnpind in the regression of dlnpp on dlnpind is the price sensitivity index (corresponding approximately to the slope of the function shown in FIG. 1a). The coefficient in the regression of dlntraffic on dlnpind is the promotion or traffic sensitivity index. This year over year comparison is a significant advantage when determining true price sensitivities. By looking at the difference in gross profit and traffic in the same season but between two different years, the potential confounding effects of seasonality are eliminated in the estimate. The regressions are preferably performed separately for each store if the data permit; however, importantly, this specification in differences allows combining information across similar stores to obtain an overall "market" sensitivity for any commercially interesting group of stores.

The regression can also be done without year over year data, e.g., Inpp on Inpind, by store for a selected period of time.

Once the regression coefficients are generated, a summary report for the chain as a whole can be developed which is of significant importance in determining the price and traffic sensitivity for all stores. An example in terms of a restaurant is shown below. While not shown, a similar report could be which would show a listing of the particular results by store, e.g., what stores are highly sensitive, not sensitive, etc. in traffic and which stores are high, low, or right in terms of gross profit.

The FIGS. 2 and 3 summarize the chain's gross profit and traffic sensitivity for US restaurants only.

FIG. 2 represents gross profits and illustrates that 47% of all US stores in this example have a "Low" gross profit sensitivity. This indicates that these stores are performing below the optimal gross profit point and there are significant profit opportunities remaining within these stores. Eighteen percent of the stores are operating at the right gross profit point, and 25% are operating beyond the optimal gross profit point. There was insufficient evidence to determine the sensitivity ratings for 10% of the stores.

Referring to FIG. 3, stores characterized by "Not Sensitive" to price do not drive traffic through price promotions, while stores that are "Highly Sensitive" to price can improve traffic with price promotions on items. Stores characterized by "Low" gross profit sensitivity and "Low" traffic sensitivity have an opportunity for increased margins by increasing prices on the proper items. The second group of stores, evidencing "High" gross profit sensitivity and "High" traffic sensitivity must exercise caution when implementing price changes and may do better with price promotions.

As noted above, a final part of the report is the list of stores and their categorizations. Stores with "insufficient evidence" simply do not have enough data variation to identify sensitivities (i.e. the regression t-statistics are <1.5 in absolute value; this number can be varied according to the level of confidence required). Sensitive stores have significantly negative coefficients, and insensitive stores have zero or positive coefficients.

While the invention is described in terms of gross profits, this measure is not always available. In these instances, sales can be substituted for profits.

While the example uses variables based on the difference in year to year, other time periods could be used such as week to adjacent week, month to adjacent month, day to adjacent day, year to adjacent year, etc.

As such, an invention has been disclosed in terms of preferred embodiments thereof which fulfills each and every one of the objects of the present invention as set forth above and provides new and improved method for determining price sensitivities for retail units.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A method of determining a price sensitivity for one or more retail units comprising:
    disregarding products at promotional price points;
    creating a fixed weight price index based on pricing information from each retail unit, wherein the index varies only when prices vary and the weights are based on an average menu mix per retail unit over a select period of time;
    regressing profits or sales and quantity sold for the retail unit on the fixed weight price index over a select period of time, and producing a regression coefficient for the fixed weight price index, wherein time differences in the price index are used as the independent variables in the regression analysis and the variable regressed is the time differences in quantity sold and gross profit;
    assigning a price sensitivity indicator based on the magnitude of the regression coefficient associated with the time differences in the price index and its t-statistic, wherein the magnitude of the indicator reflects the level of price sensitivity of the retail unit as it relates to the regressed variable and the t-statistic indicates a confidence level of this relationship; and
    providing the price sensitivity indicator to a user;
    wherein the price sensitivity indicator for profits or sales shows how the retail unit compares to a predetermined pricing index, and the price sensitivity indicator for quantity sold shows how sensitive the retail unit is to price changes.

2. The method of claim 1, wherein price sensitivity indicators for profits/sales include high, low, and right.

3. The method of claim 1, wherein price sensitivity indicators for quantity sold include not sensitive, sensitive, and highly sensitive.

4. The method of claim 1, wherein the time difference is one of a year to year time difference, a week to an adjacent week time difference, a day to an adjacent day, or a month to an adjacent month.

5. The method of claim 1, where the time difference is based on a year to year time difference.

6. The method of claim 1, wherein a log of the profits or sales or quantity sold for the retail unit are regressed on a log of the fixed weight price index.

7. The method of claim 1, wherein the retail unit comprises a store.

8. A method of determining a price sensitivity of one or more retail units comprising:
    disregarding products at promotional price points;
    creating a weighted price index for each retail unit for a period of time based on pricing information from each retail unit and the weights are based on an average menu mix per retail unit over a select period of time;
    regressing gross profit of the retail unit on the weighted price index over a select period of time to determine where the weighted price index falls with respect to a gross profit function, and producing a regression coefficient for the weighted price index, wherein time differences in the price index are used as the independent variables in the regression analysis and the variable regressed is the time differences in quantity sold and gross profit;
    ascertaining a magnitude of price sensitivity against gross profit for the retail unit;
    assigning a price sensitivity indicator based on the magnitude of the regression coefficient associated with the time differences in the price index and its t-statistic, wherein the magnitude of the indicator reflects the level of price sensitivity of the retail unit as it relates to the regressed variable and the t-statistic indicates a confidence level of this relationship; and
    providing the magnitude of price sensitivity to a user;
    wherein the price sensitivity indicator shows how the retail unit compares to a predetermined pricing index.

9. A method of determining a price sensitivity of one or more retail units comprising:
  disregarding products at promotional price points;
  creating a weighted price index for each retail unit for a period of time based on pricing information from each retail unit and the weights are based on an average menu mix per retail unit over a select period of time;
  regressing quantity sold of the retail unit on the weighted price index over a select period of time to determine where the weighted price index falls with respect to the quantity sold, and producing a regression coefficient for the weighted price index, wherein time differences in the price index are used as the independent variables in the regression analysis and the variable regressed is the time differences in Quantity sold and gross profit;
  ascertaining a magnitude of price sensitivity against quantity of items sold for the retail unit;
  assigning a price sensitivity indicator based on the magnitude of the regression coefficient associated with the time differences in the price index and its t-statistic, wherein the magnitude of the indicator reflects the level of price sensitivity of the retail unit as it relates to the regressed variable and the t-statistic indicates a confidence level of this relationship; and
  providing the magnitude of price sensitivity to a user;
  wherein the price sensitivity indicator shows how sensitive the retail unit is to price changes.

10. A method of claim 9, further comprising regressing customer count for the retail unit on the weighted price index to determine where the weighted price index falls with respect to the customer count in order to ascertain a magnitude of price sensitivity against customer count for the retail unit.

11. The method of claim 9, further comprising assigning a gross profit indicator to reflect where the weighted price index falls with respect to the gross profit.

12. The method of claim 9, further comprising assigning a sensitivity indicator to reflect where the weighted price index falls with respect to the quantity of items sold.

13. The method of claim 9, wherein the period of time is a year to year time period, and the regression is based on the year to year differences in the weighted price index.

14. The method of claim 10, further comprising assigning a gross profit indicator to reflect where the weighted price index falls with respect to the gross profit.

15. The method of claim 10, further comprising assigning a sensitivity indicator to reflect where the weighted price index falls with respect to the quantity of items sold.

16. The method of claim 10, wherein the period of time is a year to year time period, and the regression is based on the year to year differences in the weighted price index.

17. The method of claim 11, wherein the period of time is a year to year time period, and the regression is based on the year to year differences in the weighted price index.

18. The method of claim 12, wherein the period of time is a year to year time period, and the regression is based on the year to year differences in the weighted price index.

19. The method of claim 8, wherein the gross profit function comprises a quadratic function that relates gross profit to a price index for the retail unit.

* * * * *